United States Patent [19]
Kojima et al.

[11] Patent Number: 6,056,014
[45] Date of Patent: May 2, 2000

[54] DRAINAGE COLLECTIVE PIPE JOINT

[75] Inventors: Noriatsu Kojima; Yozo Kako; Toshihiko Kawamura, all of Nagoya, Japan

[73] Assignee: Noriatsu Kojima, Nagoya, Japan

[21] Appl. No.: 09/119,749

[22] Filed: Jul. 21, 1998

[30] Foreign Application Priority Data

Jul. 31, 1997 [JP] Japan ..................... 9-206135
Nov. 28, 1997 [JP] Japan ..................... 9-327469

[51] Int. Cl.⁷ ..................................... F16L 41/00
[52] U.S. Cl. ........................ 138/39; 138/37; 366/337; 285/129.1
[58] Field of Search .................. 138/37, 39; 366/336, 366/337; 285/129.1

[56] References Cited

U.S. PATENT DOCUMENTS

| | | | |
|---|---|---|---|
| 630,605 | 8/1899 | Gordon | 138/39 |
| 2,065,789 | 12/1936 | Bolsinger | 138/39 X |
| 2,246,871 | 6/1941 | Balch | 138/37 X |
| 2,280,195 | 4/1942 | Long | 138/37 X |
| 2,566,654 | 9/1951 | Collison et al. | 138/39 |
| 3,346,887 | 10/1967 | Sommer | 285/129.1 |
| 3,894,302 | 7/1975 | Lasater | 138/39 X |

FOREIGN PATENT DOCUMENTS

| | | |
|---|---|---|
| 5-20640 | 3/1993 | Japan . |
| 5-61414 | 9/1993 | Japan . |

*Primary Examiner*—Patrick Brinson
*Attorney, Agent, or Firm*—Arent Fox Kintner Plotkin & Kahn

[57] ABSTRACT

The invention relates to a drainage collective pipe joint where wastewater flowing in a collective housing of multiple floors is subjected to swirl flow and is allowed to flow down. The drainage collective pipe joint comprises an upper vertical pipe connection port to connect an upper vertical pipe, a main body part having a taper pipe part formed in downward taper shape at lower side and installed at lower side of the upper vertical pipe connection port, a lower vertical pipe connection port installed at lower side of the main body part and capable of connecting a lower vertical pipe, at least one horizontal branch pipe connection port installed at the main body part and connected a horizontal branch pipe, and a plurality of drainage flow control guides projected from an inner circumferential wall at lower side of the horizontal branch pipe connection port of the main body part and capable of controlling the drainage flow. The plurality of drainage flow control guides comprise at least one upper drainage control guide installed at upper side in the pipe direction and at least one lower drainage flow control guide installed at lower side in the pipe axial direction.

According to the drainage collective pipe joint, the flowing-in wastewater is prevented from flowing reversely into the horizontal branch pipe and the wastewater is reduced in flow rate and swirled and the fluctuation of the air pressure in the drainage system can be suppressed.

17 Claims, 18 Drawing Sheets

● pressure within pipe in each flow rate

| flow rate (ℓ/s) | pressure within pipe (mmAq) | |
|---|---|---|
| | minimum | maximum |
| 1.0 | −4.7　7F | +5.9　4F |
| 2.0 | −11.7　5F | +7.0　1F |
| 3.0 | −13.7　2F | +7.8　2F |
| 4.0 | −15.0　7F | +11.7　1F |
| 5.0 | −23.4　2F | +17.6　1F |
| 6.0 | −27.3　5F | +10.5　1F |
| 6.5 | −29.7　6F | +13.7　1F |
| 7.0 | −39.1　2F | +13.7　1F |

DRAINAGE COLLECTIVE PIPE JOINT

BACKGROUND OF THE INVENTION

1. Field of the Invention

The present invention relates to a drainage collective pipe joint where wastewater flowing in a collective housing of multiple floors is subjected to swirl flow and is allowed to flow down.

2. Description of the Prior Art

In the prior art, a drainage collective pipe joint to be used in air vent pipe arrangement structure of single pipe type comprises an upper vertical pipe connection port, a main body part having a taper pipe part and a lower vertical pipe connection port connected in the axial direction. The main body part is provided with at least one horizontal branch pipe connection port. Sewage or wastewater from each floor is allowed to flow in through the horizontal branch pipe, and is joined with that flowing in from the upper vertical pipe, and swirl flow is formed and the joined flow is allowed to flow down into a lower floor.

As such swirl flow forming means, for example, JP-B 62-50517 is disclosed where a deflecting plate is provided to a main body part just below an upper vertical pipe connection port, and a taper pipe part is provided with a plurality of vanes having slant angle for swirl motion and arranged in rotary symmetry.

According to such swirl flow forming means, wastewater from the upper vertical pipe is deflected in one direction by the deflecting plate and collides with the inner circumferential wall of the main body part and scatters and falls to the taper pipe part. Also wastewater from the horizontal branch pipe falls to the taper pipe part and is caught by the vanes in the taper pipe part and the wastewater caught there flows down along the vanes and is supplied with the swirling property and becomes the swirl flow.

According to the swirl flow, the vent core passing through the upper and lower vertical pipes within the drainage collective pipe joint is formed in the wastewater flow, and circulation of air in the drain pipe system is intended thereby variation of the air pressure within the upper and lower vertical pipes is suppressed.

In such a drainage collective pipe joint in conventional structure, however, wastewater flowing from the upper vertical pipe is deflected in one direction by the deflecting plate and collides with the inner circumferential wall of the main body part and flows down. Therefore when the horizontal branch connection port is provided at the opposite side of the deflecting plate, a problem occurs in that the deflected wastewater as above described flows reversely into the horizontal branch pipe.

Consequently in the drainage collective pipe joint, it is usually avoided that the horizontal branch pipe connection ports are provided in four directions at intervals of 90 degrees in the circumferential direction, but the horizontal branch drain pipe connection ports are provided in two or three directions except for the opposite side to the deflecting plate.

Also a problem occurs in that the deflected wastewater bounces back at the inner circumferential wall of the main body part, and flows reversely into also the horizontal branch pipe connection port provided at the side other than the opposite side of the deflecting plate.

Also the vanes for deflection has limitation in the slant angle from the viewpoint of prevention of the water plug phenomenon in the taper pipe part. Therefore further improvement in providing the swirling property has been desired.

SUMMARY OF THE INVENTION

In view of the above-mentioned problems, an object of the present invention is to provide a drainage collective pipe joint where flowing-in wastewater is reduced in flow rate and swirled and the counterflow to a horizontal branch pipe is prevented.

Another object of the present invention is to provide a drainage collective pipe joint where the drainage is reduced in flow rate and supplied with good swirling property and fluctuation of the air pressure is suppressed and the counterflow to the horizontal branch pipe can be prevented.

A drainage collective pipe joint of the present invention comprises:

an upper vertical pipe connection port connecting an upper vertical pipe;

a main body part having a taper pipe part formed in downward taper shape at lower side thereof and installed at lower side of the upper vertical pipe connection port;

a lower vertical pipe connection port installed at lower side of the main body part and connecting a lower vertical pipe;

at least one horizontal branch pipe connection port installed at the main body part and capable of connecting a horizontal branch pipe; and a plurality of drainage flow control guides projected from an inner circumferential wall at lower side of the horizontal branch pipe connection port of the main body part and capable of controlling the drainage flow, wherein the plurality of drainage flow control guides comprise at least one upper drainage flow control guide installed at upper side in the pipe axial direction and at least one lower drainage flow control guide installed at lower side in the pipe axial direction.

In another embodiment, a drainage collective pipe joint comprises:

an upper vertical pipe connection port connecting an upper vertical pipe;

a main body part having a taper pipe part formed in downward taper shape at lower side thereof and installed at lower side of the upper vertical pipe connection port;

a lower vertical pipe connection port installed at lower side of the main body part and connecting a lower vertical pipe;

a plurality of horizontal branch pipe connection ports installed at the main body part and capable of connecting a horizontal branch pipe; and at least one swirl guide projected at an inner circumferential wall of the main body part and capable of controlling the drainage flow, wherein the main body part is provided with at least one rate reduction guide projected from an inner circumferential wall at lower side of the plurality of horizontal branch connection ports and at upper side of the swirl guide and capable of controlling the drainage flow.

In still another embodiment, a drainage collective pipe joint comprises:

an upper vertical pipe connection port connecting an upper vertical pipe;

a main body part having a straight pipe shell part in straight pipe shape and a taper pipe part formed in downward taper shape at lower side of the straight pipe shell part and installed at lower side of the upper vertical pipe connection port;

a lower vertical pipe connection port installed at lower side of the main body part and connecting a lower vertical pipe; and at least one horizontal branch pipe connection port installed at the main body part and capable of connecting a horizontal branch pipe, wherein the main body part is provided with at least one first swirl guide and at least one second swirl guide projected from an inner circumferential wall at lower side of the horizontal branch pipe connection port respectively and capable of controlling the drainage flow, and the first swirl guide and the second swirl guide are opposed asymmetrically with respect to the pipe axis.

According to the present invention, since a flow rate reduction guide is installed at lower side from a horizontal branch pipe connection port through which sewage of large flow rate flows in, the counterflow of the flowing-in wastewater to the horizontal branch pipe can be prevented, and the wastewater is reduced in flow rate and swirled thereby fluctuation of the air pressure in the drainage pipe system can be suppressed.

Also the present invention has an effect in that the horizontal branch pipe connection ports can be arranged in four directions different from each other by 90 degrees on the outer circumference of the main body part.

Also since the first swirl guide and the second swirl guide are opposed asymmetrically with respect to the pipe axis at lower side from the horizontal branch pipe connection port, a plurality of swirl stream lines different in the lead angle and the flow rate can be formed within the pipe joint and these stream lines can be joined together so that the joined drainage stream lines are improved in the swirl property and the flow rate reduction and fluctuation of the air pressure in the drainage pipe system is suppressed.

Also the present invention has an effect in that since the flowing-in wastewater is supplied with the swirl property and is reduced in the flow rate in a position at least 50 mm distant from lower side of the horizontal branch pipe connection port, the counterflow to the horizontal branch pipe due to the deflection and sputtering of the wastewater or the like can be prevented.

DESCRIPTION OF THE PREFERRED EMBODIMENTS

Figure 1:
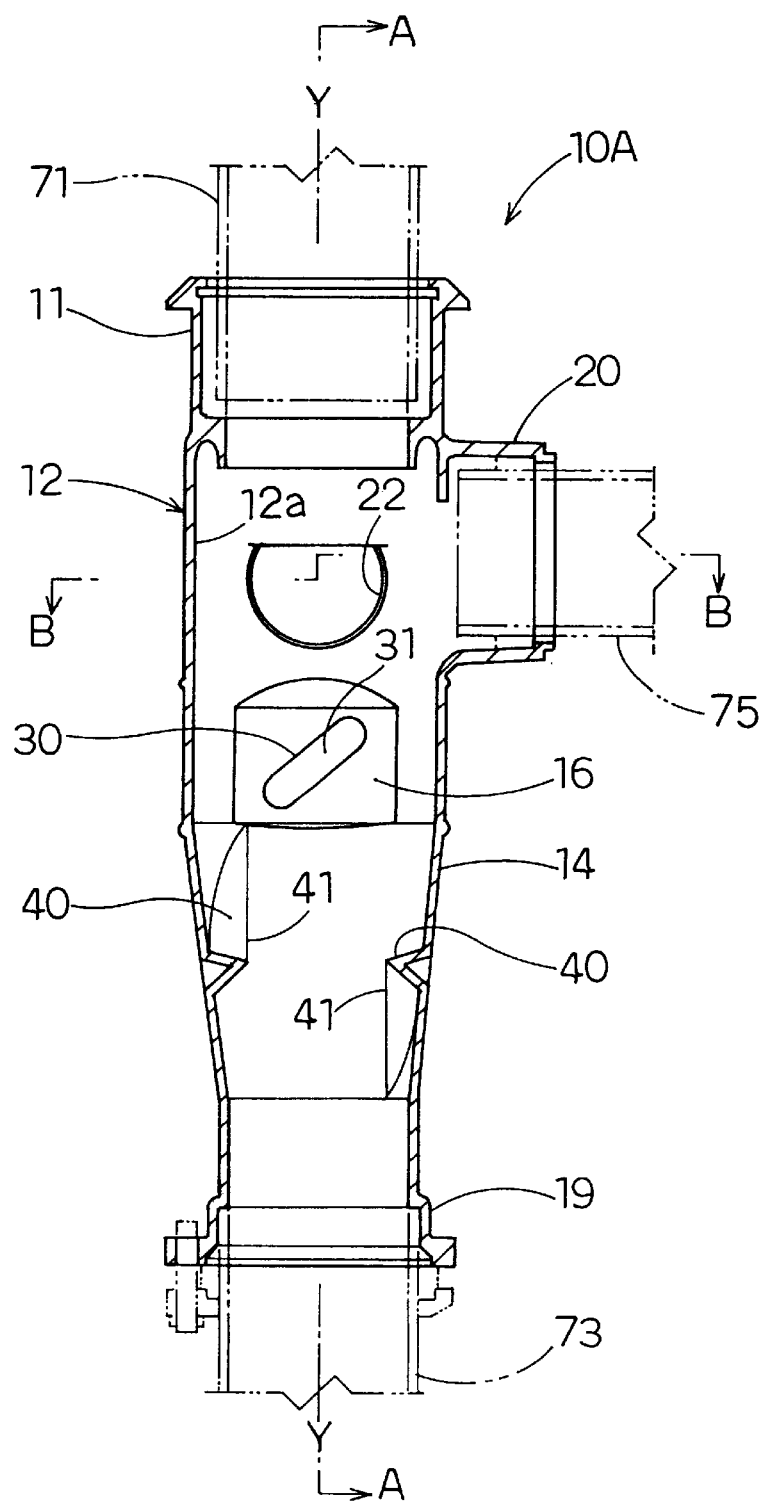
FIG. 1 is a front sectional view of a drainage collective pipe joint in a first embodiment of the invention.

Embodiments of the present invention will be described based on the accompanying drawings as follows.

FIGS. 1 to 7 show a first embodiment of the present invention. In the figures, a drainage collective pipe joint (hereinafter referred to as "pipe joint") designated by reference numeral 10A comprises an upper vertical pipe connection port 11, a main body part 12 having a taper pipe part 14 and installed at lower side of the upper vertical pipe connection port 11, a lower vertical pipe connection port 19 installed at lower side of the main body part 12, horizontal branch pipe connection ports 20, 22 installed at a side wall of the main body part 12, and swirl guides 40, 40 projected at an inner circumferential wall 12a of the taper pipe part 14. Further a flow rate reduction guide 30 is projected at the inner circumferential wall 12a of the main body part 12. In this embodiment, the flow rate reduction guide 30 forms upper drainage flow control guide means, and the swirl guide 40 forms lower drainage flow control guide means.

In the upper vertical pipe connection port 11, an upper vertical pipe 71 suspended from an upper floor holds the watertight state using packing (not shown) and can be connected thereto.

The main body part 12 is formed in cylindrical shape with diameter larger than that of the upper vertical pipe 71, and a taper pipe part 14 in downward taper shape is formed on a lower half of the main body part 12.

A lower vertical pipe connection port 19 with a flange is installed on the bottom end of the taper pipe part 14 through a straight cylindrical part, and the lower vertical pipe connection port 19 holds the watertight state using packing and can be connected to an upper end part of a lower vertical pipe 73.

Horizontal branch pipe connection ports 20, 22 opened to lateral side are provided in substantially the same level at a prescribed position on a side wall of an upper half of the main body part 12, and the horizontal branch pipe connection ports 20, 22 are opened in directions different from each other by 90 degrees in the circumferential direction.

A horizontal branch pipe 75 carrying sewage of large flow rate can be connected to the horizontal branch pipe connection port 20 using packing, and a horizontal branch pipe 77 carrying wastewater of small flow rate can be connected to the horizontal branch pipe connection port 22 using packing.

Figure 2:
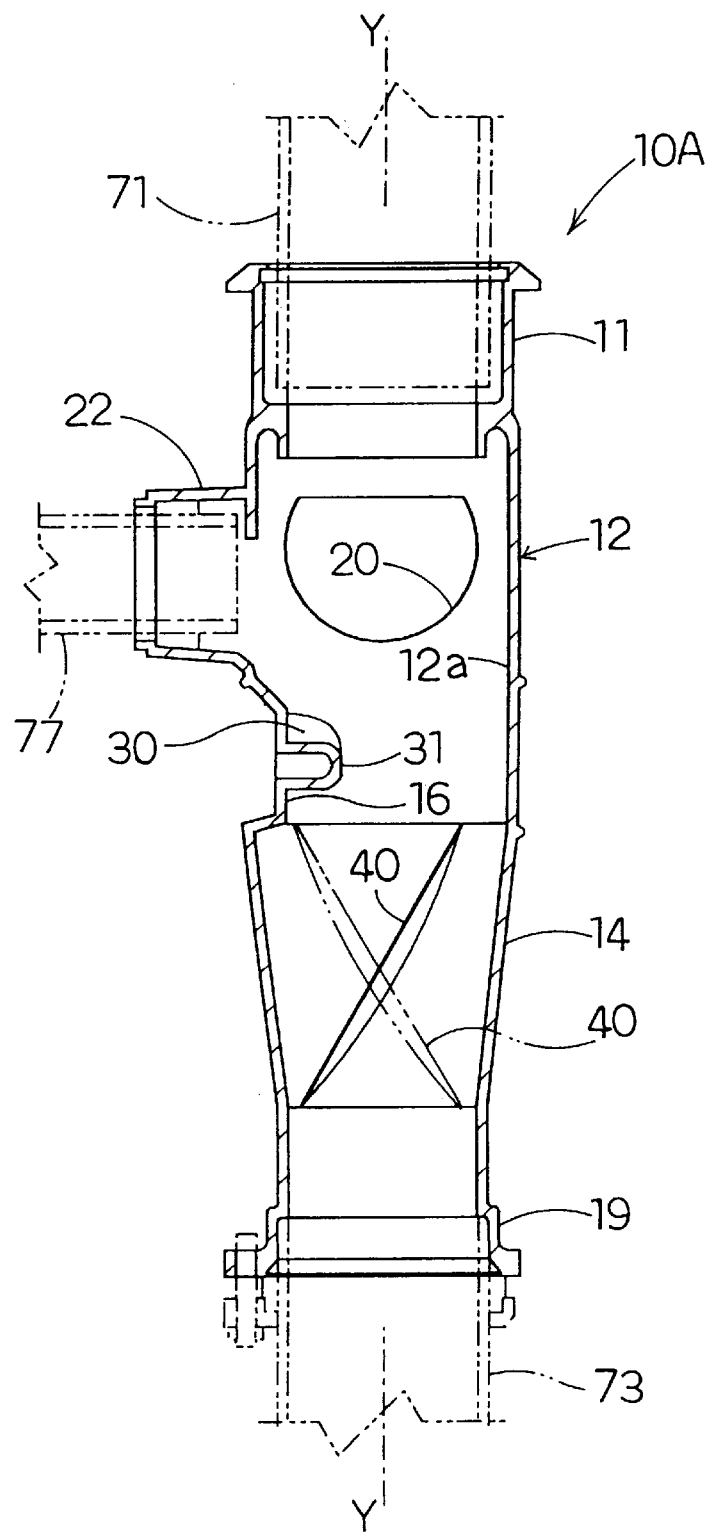
FIG. 2 is a sectional view taken on arrow line A—A in FIG. 1.
Figure 3:
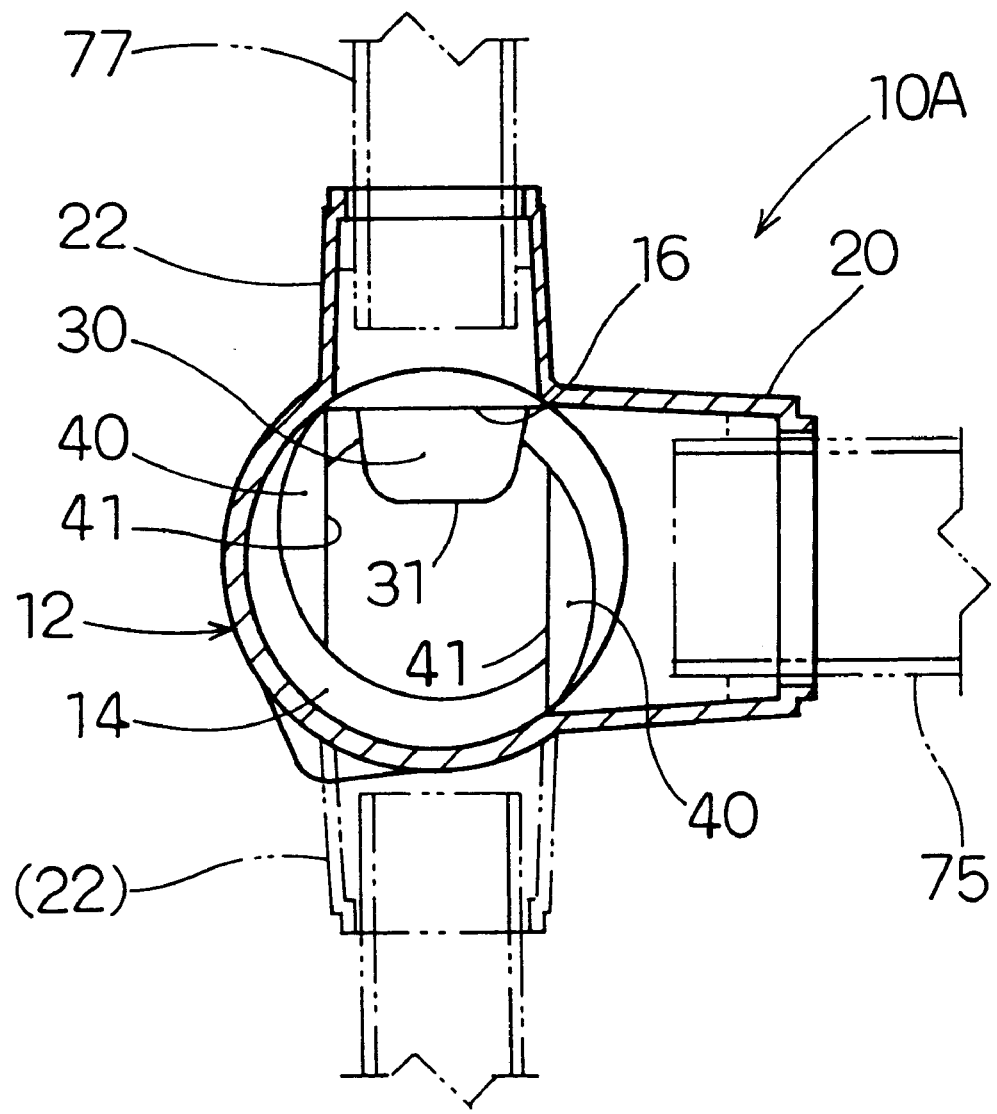
FIG. 3 is a sectional view taken on arrow line B—B in FIG. 1.

In each of the swirl guides 40, 40, the projection on the horizontal plane is formed within a ½ of circumference of a circle and the length direction is slanted in left downward direction (left downward direction by about 55 degrees in this example) as shown in FIG. 2. The swirl guides 40, 40 are installed in rotary symmetry so that they are opposed with respect to the pipe axis Y—Y, and mainly used to control the swirling of the drainage flow. Also a projection end edge 41 of the swirl guide 40 is projected to the inside of about 10% from the inner diameter of the upper vertical pipe 71, and in the projection on the horizontal plane, the extending direction of the projection end edge 41 and the axial line of the horizontal branch pipe connection port 20 are arranged in the orthogonal relation.

The flow rate reduction guide 30 in this example is formed in substantially rectangular flat plane shape, and is projected to the inside at a definite position with respect to the swirl guides 40, 40 at lower side of the horizontal branch pipe connection port 22 and at upper side of the taper pipe port 14. The flow rate reduction guide 30 is formed mainly to control the reduction of flow rate of the drainage flow.

A projection end edge 31 of the flow rate reduction guide 30 is slanted in left downward direction (left downward direction by about 40 degrees) as shown in FIG. 1, and is projected to the inside by about 25% from the inner diameter of the upper vertical pipe 71. Also in the projection on the horizontal plane, the extending direction of the projection end edge 31 and the axial line of the horizontal branch pipe connection port 20 are in the parallel relation. In addition, numeral 16 designates a pedestal swollen to the inside from the inner circumferential wall 12a so as to form the flow rate reduction guide 30.

Next, function of the pipe joint 10A constituted in such manner will be described.

Figure 4:
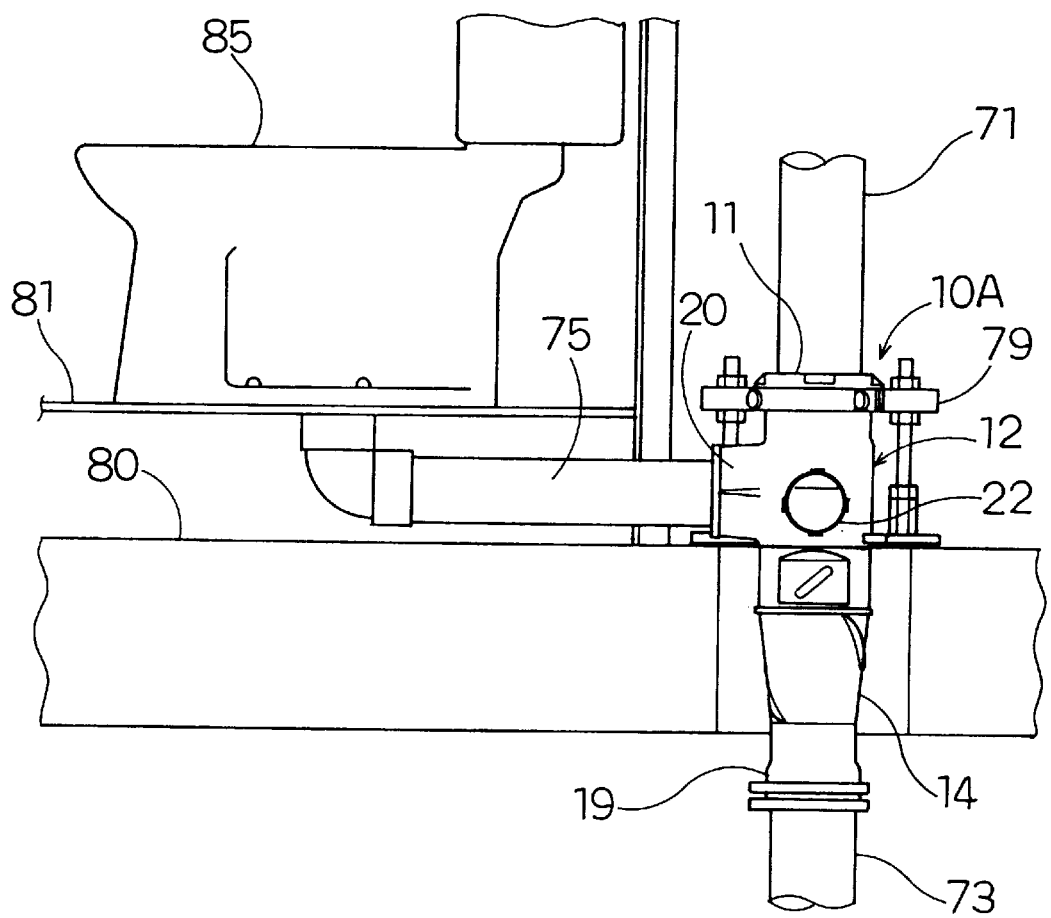
FIG. 4 is a diagram showing an installation example of a drainage collection pipe joint in the first embodiment.
Figure 5:
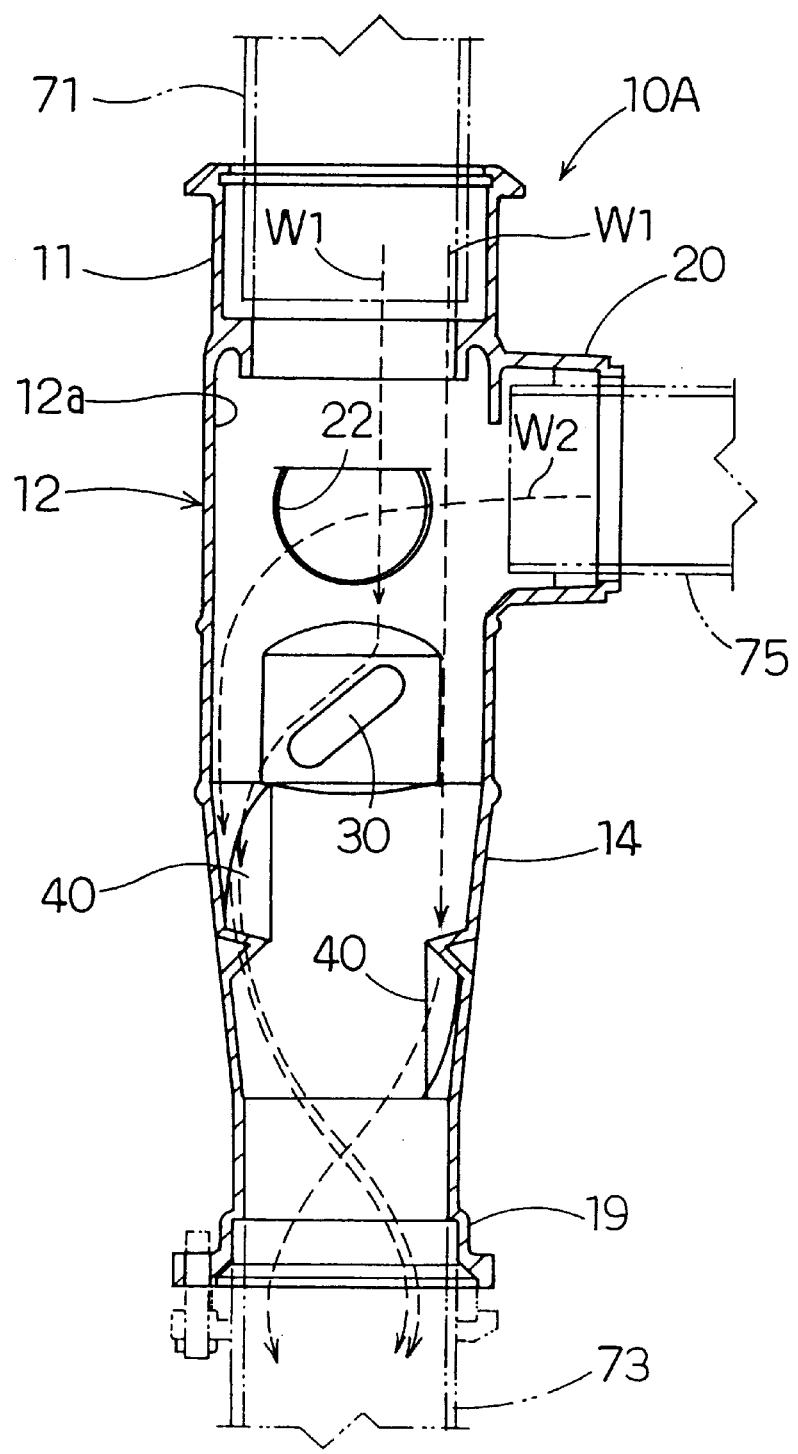
FIG. 5 is a front sectional view showing flow of wastewater.
Figure 6:
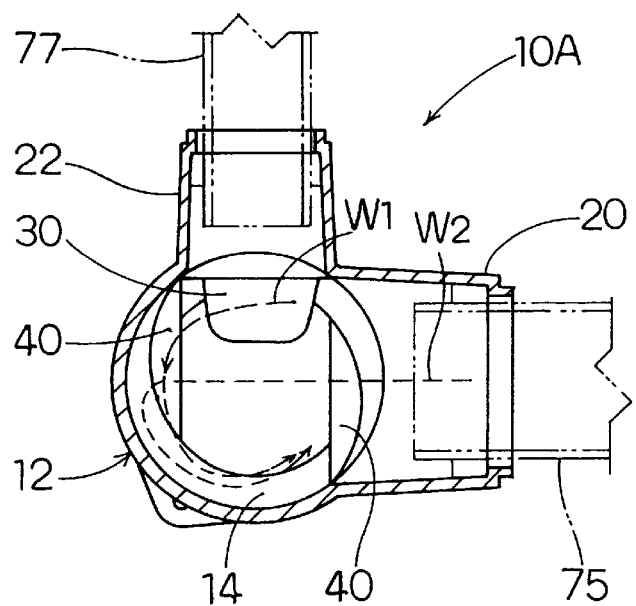
FIG. 6 is a plane sectional view showing flow of wastewater.

In the pipe joint 10A, as shown in FIG. 4 for example, the upper vertical pipe connection port 11 and the horizontal branch pipe connection ports 20, 22 are positioned at upper side of a flat slab 80, and the lower vertical pipe connection port 19 is projected at lower side of the flat slab 18 and embedded. In addition, numeral 79 designates a support member supporting upper side of the pipe joint 10A.

The upper vertical pipe 71 and the lower vertical pipe 73 are connected to the upper vertical pipe connection port 11 and the lower vertical pipe connection port 19 respectively, and a toilet bowl 85 fixed on a floor 81 is led to the horizontal branch pipe connection port 20 through the horizontal branch pipe 75 and a horizontal branch pipe for wastewater from a bath room (not shown) is connected to the horizontal branch pipe connection port 22.

Wastewater flowing within the upper vertical pipe 71 usually flows down to an inner wall surface of the pipe where a film of water is spread, and an air vent core is formed on the inner circumferential side of the water film. Wastewater W1 flowing into the main body part 12 from the upper vertical pipe connection port 11 (shown by broken line arrow W1 in FIGS. 5 and 6) falls along the inner circumferential wall 12a, and a part of the wastewater attains to the upper surface of the flow rate reduction guide 30. The wastewater W1 colliding with the flow rate reduction guide 30 is reduced in the flow rate and is guided to the left downward slant and its flowing course is varied and the wastewater W1 is allowed to flow onto one swirl guide 40 linked with the flowing course in spiral shape.

Also the wastewater W1 flows directly onto the swirl guides 40, 40, and another part of the wastewater W1 is received by the taper pipe part 14 and the flowing-down direction is guided to the lower surface side of the swirl guide 40 and the wastewater W1 flows down while the swirling property in counterclockwise direction is supplied thereto.

In such way, the wastewater W1 from the upper vertical pipe connection port 11 is reduced in the flow rate by the flow rate reduction guide 30 and the swirl guide 40 without the counterflow to the horizontal branch pipe connection ports 20, 22, and is supplied with the swirling property and flows down to the lower vertical pipe connection port 19 while holding the air vent core in the pipe axis.

On the other hand, the wastewater W2 of large flow rate from the horizontal branch pipe 75 (shown by broken line arrow W2), flows from the horizontal branch pipe connection port 20 into the main body part 12, and falls in a curve toward the inner circumferential wall 12a at the opposite side. The wastewater W2 is joined smoothly with a part of the wastewater W1 flowing-down at the side of the inner circumferential wall 12a at lower side from the height position of the horizontal branch pipe connection ports 20, 22, and flows onto one swirl guide 40. The wastewater W2 is guided by the swirl guide 40 and is reduced in the flow rate and supplied with the swirling property in the counterclockwise direction and flows down.

Also in the wastewater from the horizontal branch pipe 77, the flow rate flowing at a time is a little and the flowing force is small. Consequently the wastewater from the horizontal branch pipe 77 flows onto the flow rate reduction guide 30, the taper pipe part 14 and the swirl guides 40, 40 within the main body part 12 and is drawn into the wastewater W1, W2 and flows down toward the lower vertical pipe connection port 19 while swirling.

In such way, the wastewater flowing into the pipe joint 10A is joined smoothly and reduced in the flow rate without the counterflow to the horizontal branch pipes 75, 77, and becomes the swirl flow along the inner circumferential wall 12a and flows down. Consequently the air vent core in the pipe axis Y—Y direction is formed within the pipe joint 10A and the air vent is performed between the upper vertical pipe 71 and the lower vertical pipe 73 and fluctuation of the air pressure in the drainage pipe system is suppressed effectively.

Figure 7:
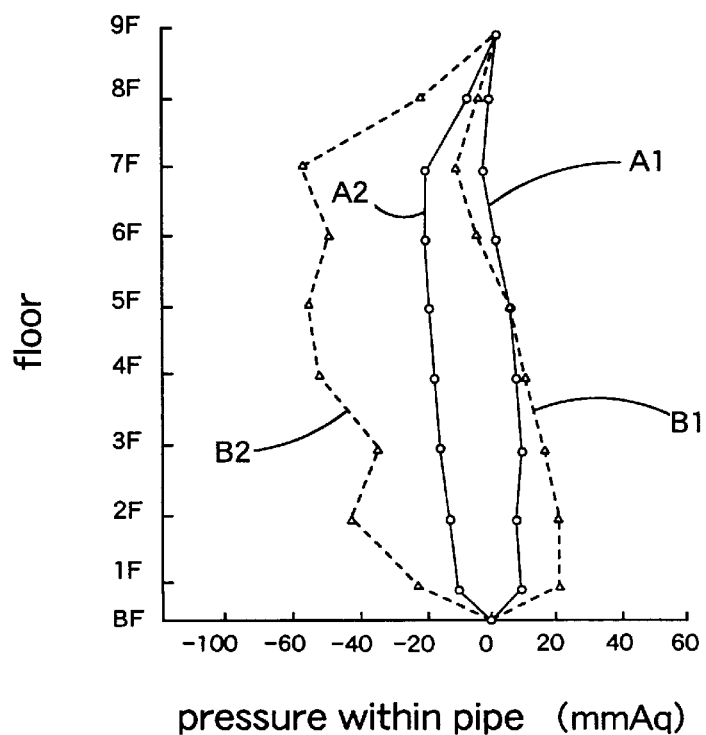
FIG. 7 is a graph showing fluctuation of measured air pressure within a pipe in definite flow rate 5 l/s.

FIG. 7 shows fluctuation of pressure within a pipe at the state of definite flow rate 5 l/s in the drainage pipe system corresponding to a collective housing of nine floors using the pipe joint 10A of this embodiment. Curves A1, A2 in FIG. 7 show the maximum value and the minimum value of the fluctuation in each floor when the pipe joint 10A is used. Also curves B1, B2 show the maximum value and the minimum value in each floor when the comparing pipe joint of similar shape without the flow rate reduction guide 30 is used. As shown in FIG. 7, in the pipe joint 10A, fluctuation of the pressure in each floor is little in comparison with the comparing pipe joint and excellent effect of suppressing the fluctuation of the air pressure is shown.

In this embodiment, a plurality of flow rate reduction guides 30 may be installed in the same level as that of the main body part 12. Also horizontal branch pipe connection ports may be further installed in substantially the same level as that of the horizontal branch pipe connection ports 20, 22 and in direction different by 90 degrees. For example, a horizontal branch pipe connection port (22) as shown by dash-and-dot line in FIG. 3 may be further installed, and the pipe joint corresponding to horizontal branch pipes in three to four directions may be constituted. In this example, although flow rate reduction guide 30 is projected in orthogonal direction to the inner circumferential wall 12a, in order to take balance with the flow rate and the flow rate reducing effect, the projection end edge 31 may be slanted downward from the base end side.

Figure 8:
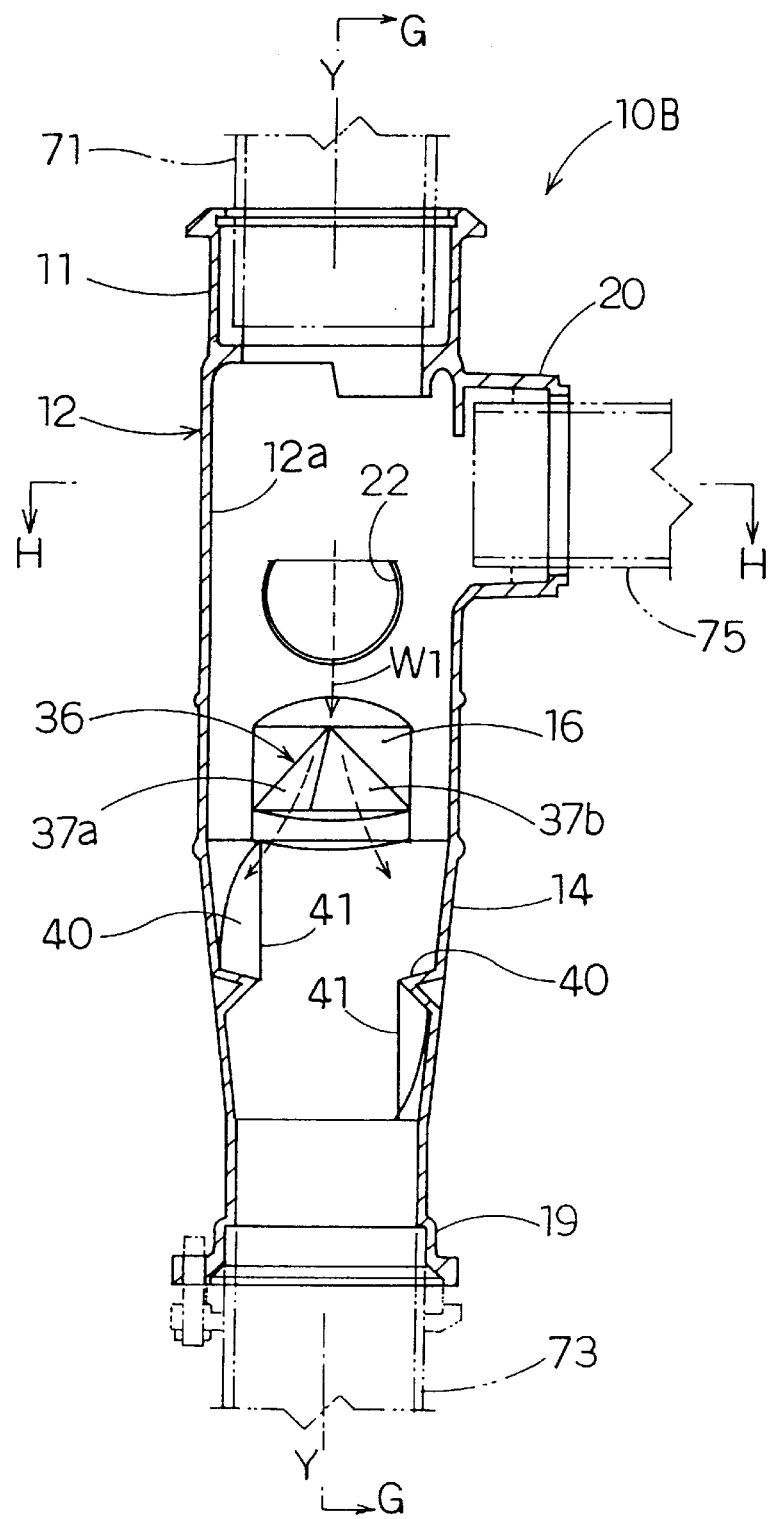
FIG. 8 is a front sectional view of a drainage collective pipe joint in a second embodiment of the invention.
Figure 9:
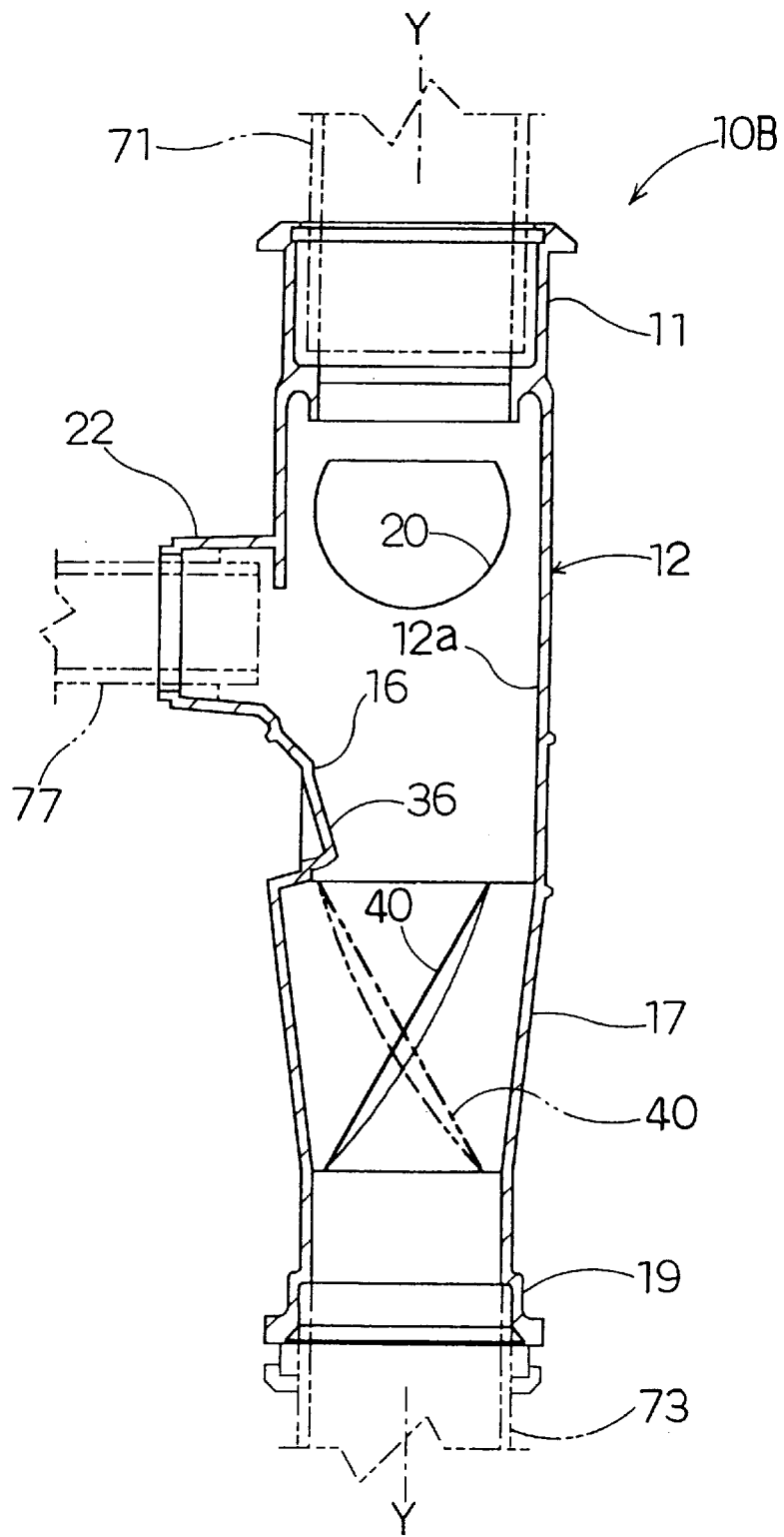
FIG. 9 is a sectional view taken on arrow line G—G in FIG. 8.
Figure 10:
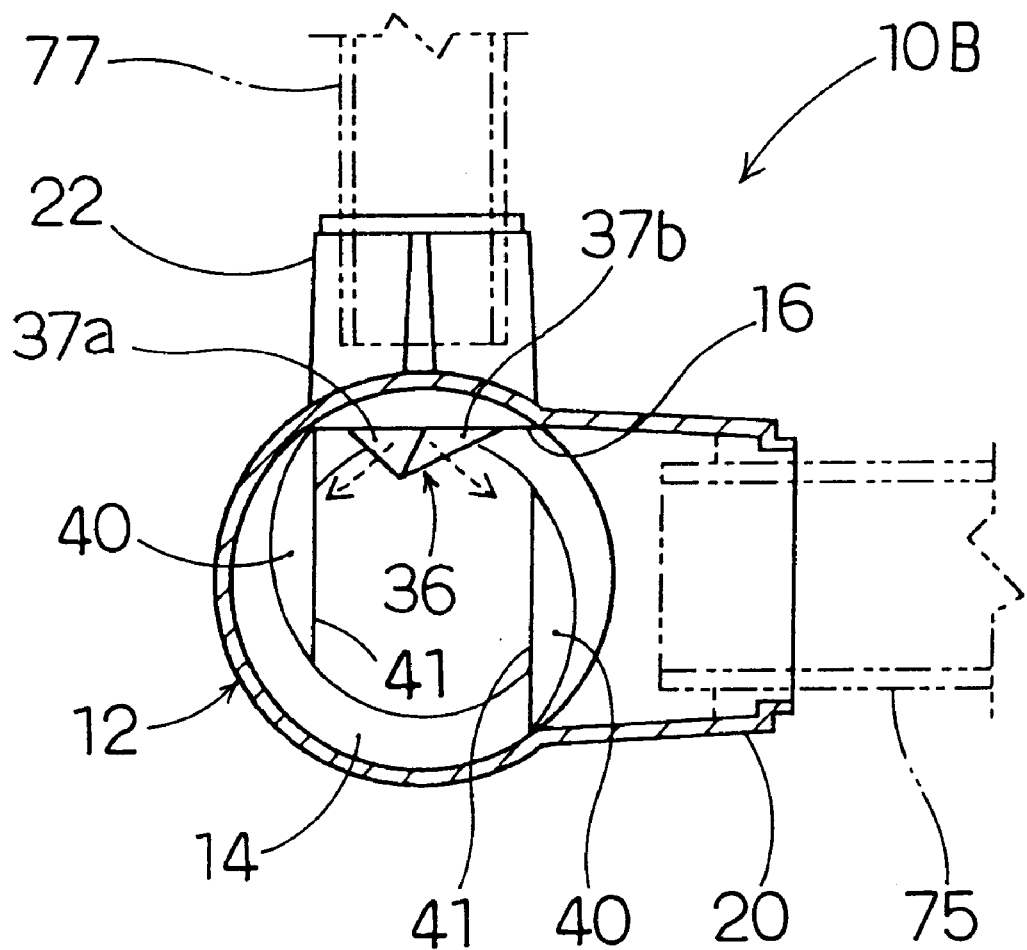
FIG. 10 is a sectional view taken on arrow line H—H in FIG. 8.

FIGS. 8 to 10 show a second embodiment of the present invention. The second embodiment is characterized in that a flow rate reduction guide projecting in triangular pyramid is provided. In the following description, the same or similar component to that in the first embodiment is designated by the same reference numeral and the detailed description shall be omitted.

A pipe joint 10B in the second embodiment is provided with a flow rate reduction guide 36 in place of the flow rate reduction guide 30 of the pipe joint 10A in the first embodiment.

The flow rate reduction guide 36 is formed in triangular pyramid shape projecting to the inside from the pedestal 16, and vertex of the triangular pyramid shape is at upper side, and in FIG. 8, a projecting surface 37a of small triangular shape is at the left side and a projecting surface 37b of large triangular shape is at the right side. Edge lines of meeting the projection surfaces 37a, 37b are formed leftward at lower side.

In the pipe joint 10B, the wastewater flowing down is divided by the projection surfaces 37a, 37b of the flow rate reduction guide 36 and deflected and flows onto both swirl guides 40, 40. In this embodiment, the projection surface 37a side performs the flow rate reducing and deflecting function more than the projection surface 37b side.

Also the projection surfaces 37a, 37b may be made the same shape, and further in FIG. 10, the triangular pyramid having projection surfaces of the same shape may be projected in the position deviated to the left from the center of the pipe joint 10B. By this flow rate reduction guide 36, the flowing-down wastewater is suitably distributed to both swirl guides 40, 40 respectively and the swirling flow can be formed more effectively.

The present invention is not limited to the above-mentioned description and drawings, but the embodiment may be modified without departing from the technical idea of the present invention. For example, shape of the flow rate reduction guide may be of plate shape, triangular pyramid shape, partial sphere shape (here, partial sphere shape means a part of sphere or a part of sphere-like shape such as oval shape having spherical surface) or the like, or combination of above-mentioned shapes or other projection shape may be used as long as it is a guide of reducing the flow rate and deflecting the drainage flow.

Also the relative position of the flow rate reduction guide and the swirl guide in the projection on the horizontal plane can be set freely depending on conditions of the drainage flow rate, diameter of the main body part or the like.

Also a flow separating guide to avoid crossing with the drainage flow from upper side may be provided just above the opening part at the inner circumferential wall side of the horizontal branch pipe connection port.

FIGS. 11 to 19 show a third embodiment of the present invention. In the figures, a drainage collective pipe joint designated by reference numeral 10C comprises an upper vertical pipe connection part 11, a main body part 12 having a straight pipe shell part 13 and a taper pipe part 14 and installed at lower side of the upper vertical pipe connection port 11, a lower vertical pipe connection port 19 installed at lower side of the main body part 12, horizontal branch pipe connection ports 20, 22 installed on a side wall of the main body part 12, and a first swirl guide 45 and a second swirl guide 50 projected on inner circumferential walls 13a, 14a of the main body part 12. In this embodiment, the first swirl guide 45 forms upper drainage flow control guide means and the second swirl guide 50 forms lower drainage flow control guide means, and the second swirl guide 50 are arranged in opposition asymmetrically with respect to the pipe axis Y—Y.

The main body part 12 has a straight pipe shell part 13 of straight pipe shape with diameter larger than that of an upper vertical pipe 71 at upper side, and a taper pipe part 14 in downward taper shape is formed at lower side. Inner diameter of the straight pipe shell part 13 is made 1.0 to 2.0 times of inner diameter d of the upper vertical pipe 71 and the bottom end of the straight pipe shell part 13 is led to the top end of the taper pipe part 14. Numeral 15 designates a bending part being bent from the straight pipe shell 13 to the taper pipe part 14.

A lower vertical pipe connection port 19 extending in straight pipe shell with inner diameter 1.0 d is provided at the bottom end of the taper pipe part 14, and the lower vertical pipe connection port 19 can be connected to the top end of a lower vertical pipe 73 while holding the watertight state using packing.

A horizontal branch pipe connection port 20 is provided on upper side wall of the straight pipe shell part 13, and a horizontal branch pipe connection port 22 is provided on intermediate side wall of the straight pipe shell part 13 in opened state toward lateral side. Both horizontal branch pipe connection ports 20, 22 are opened in directions different from each other by 90 degrees in the circumferential direction. In the vicinity of the opening at the inside of the horizontal branch pipe connection port 22, a counterflow prevention wall 23 which prevents the flowing-in of the drainage flow along the inner circumferential wall 13a is provided.

A first swirl guide 45 is formed so that the projection on the horizontal plane is within a ½ of circumference of a circle, and the first swirl guide 45 is projected to the inside from the inner circumferential wall 13a at lower side of the straight pipe shell part 13 to the inner circumferential wall 14a at upper side of the taper pipe part 14. The first swirl guide 45 controls the drainage flow and is provided to form the first swirl flow.

Figure 11:
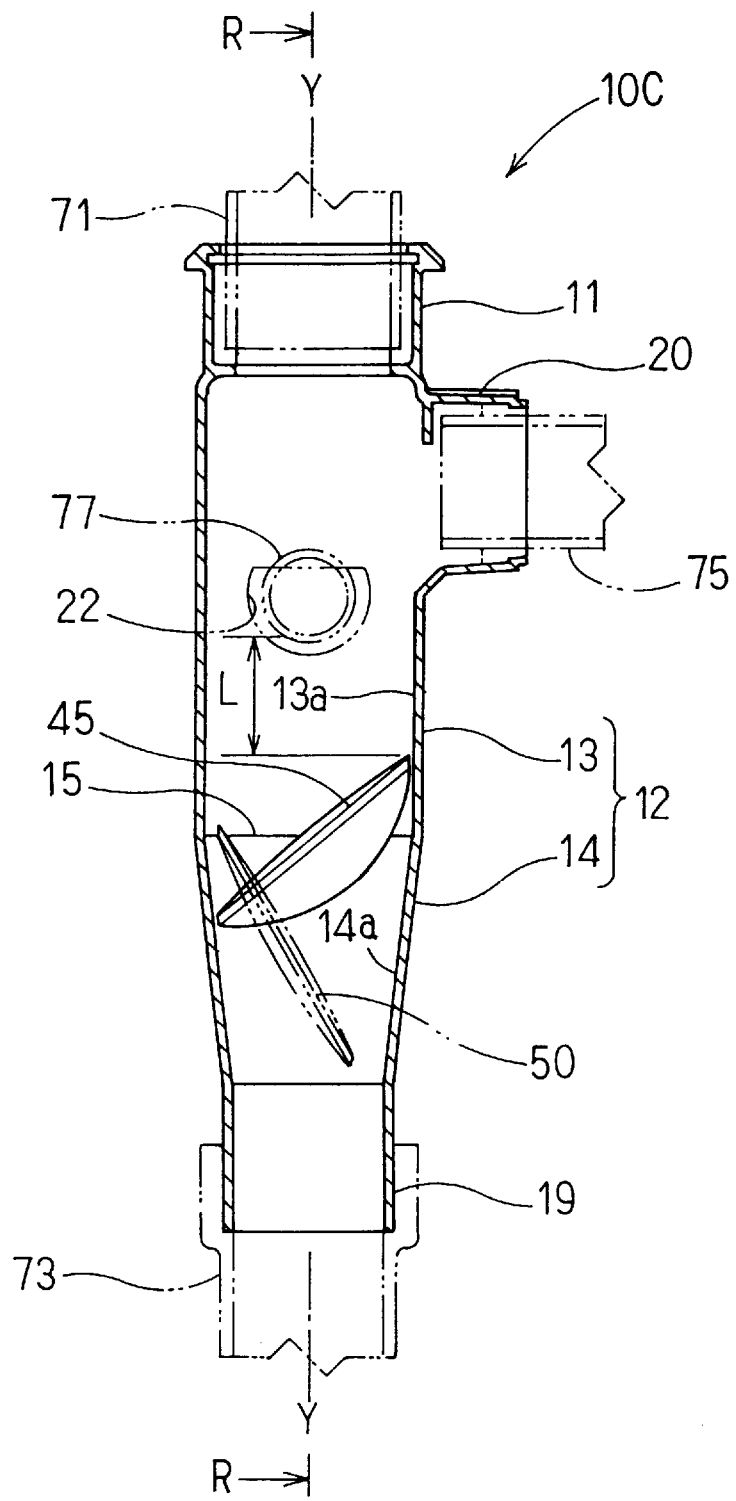
FIG. 11 is a front sectional view of a drainage collective pipe joint in a third embodiment of the invention.
Figure 12:
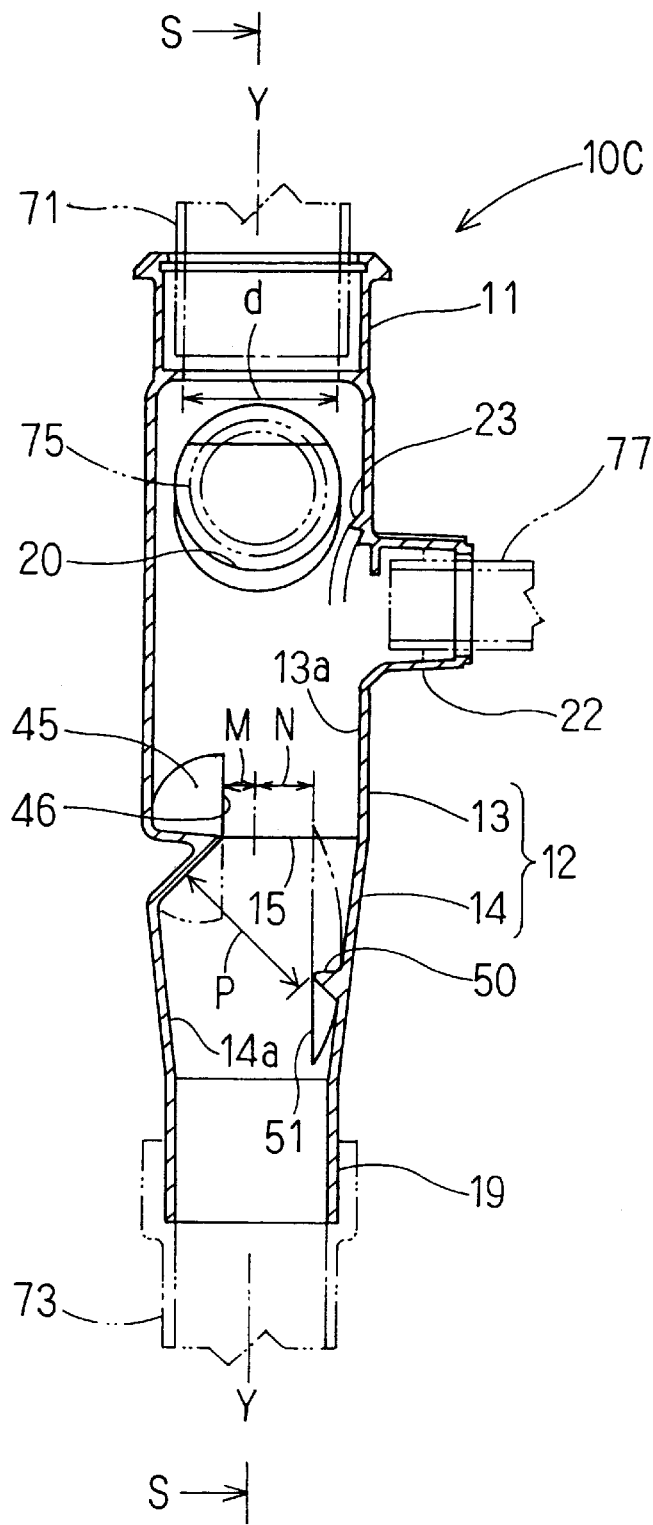
FIG. 12 is a sectional view taken on arrow line R—R in FIG. 11.

A projection end edge 46 of the first swirl guide 45 is formed linear, and distance L in the vertical direction between the top end of the projection end of the projection end edge 46 and the pipe bottom of the horizontal branch pipe 77 connected to the horizontal branch pipe connection port 22 is made at least 50 mm. The projection end edge 46 is slanted in left downward direction (left downward direction by about 40 degrees in this example) in the length direction as shown in FIG. 11, and the projection front slant angle in the pipe axis Y—Y direction is formed downward by about five degrees in this example.

Left downward slant angle of the first swirl guide 45 is preferably made downward within the range of 30 to 50 degrees from the horizontal line from the viewpoint of the lead angle of the helix made by the formed first swirl flow S1 and effect of reducing the flow rate of the flowing-in drainage flow, and the front slant angle is preferably made downward within the range of 0 to 15 degrees from the horizontal line. Further the center part of the projection end edge 46 in the length direction is formed at the position in substantially the same vertical direction (pipe axis Y—Y direction) as that of the bending part 15, and distance M between the projection end edge 46 and the pipe axis Y—Y (refer to FIG. 12) is formed in the range of 0.2 to 0.5 d.

Figure 13:
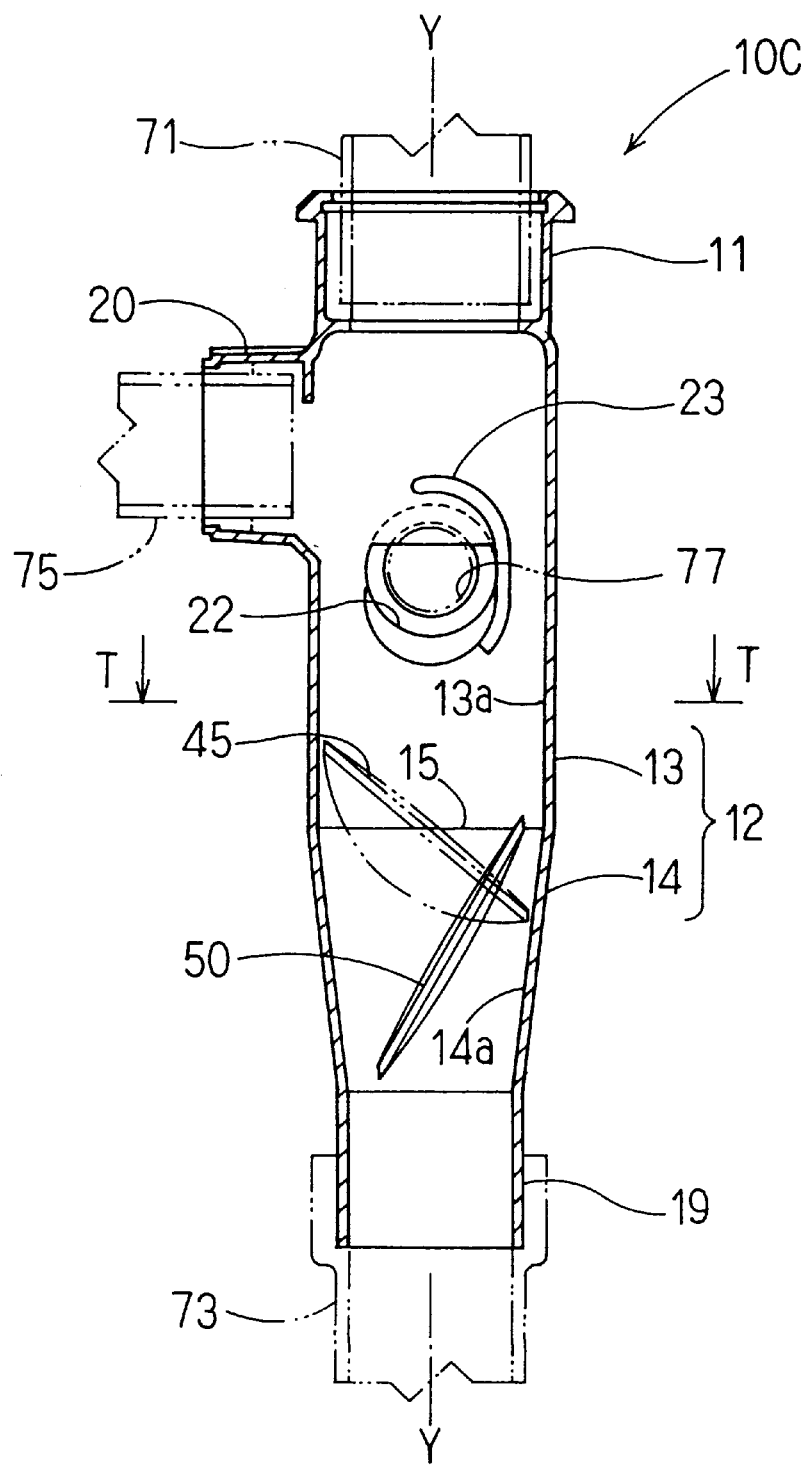
FIG. 13 is a sectional view taken on arrow line S—S in FIG. 12.
Figure 14:
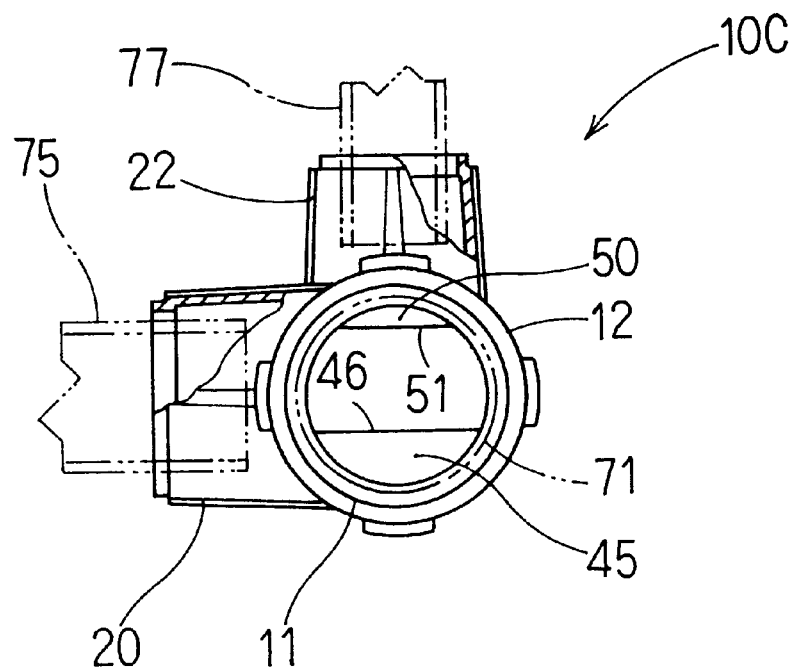
FIG. 14 is a plane view of FIG. 13.
Figure 15:
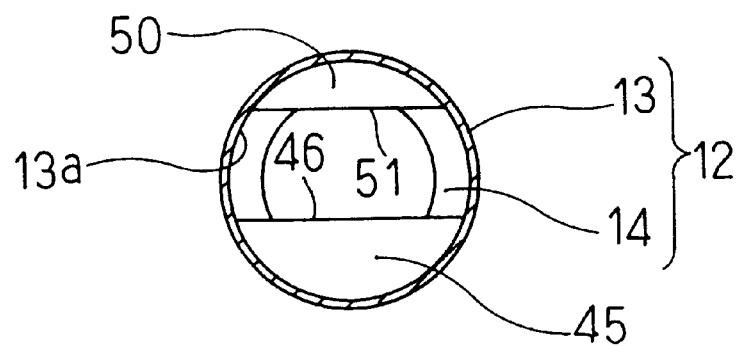
FIG. 15 is a sectional view taken on arrow line T—T in FIG. 13.
Figure 16:
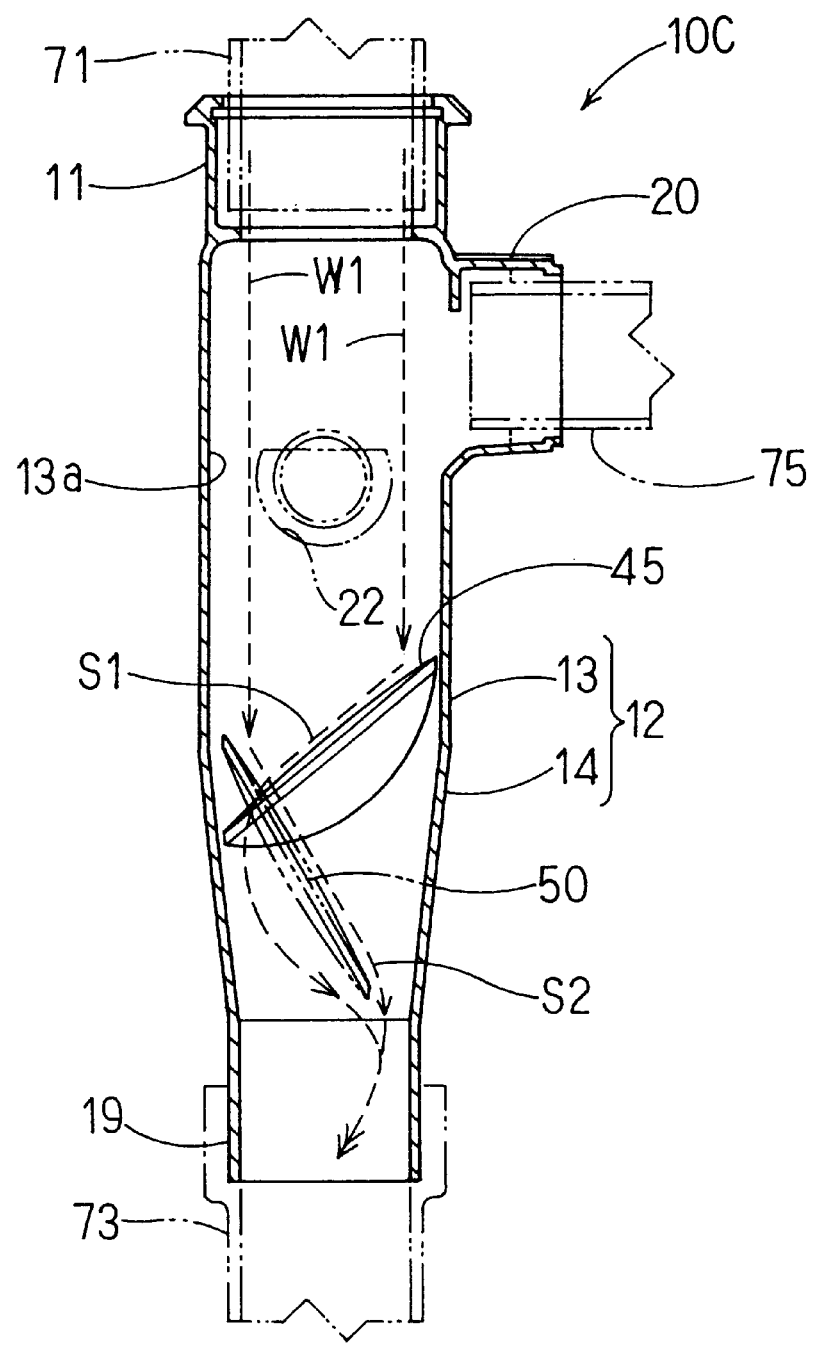
FIG. 16 is a sectional view showing flow of wastewater flowing from an upper vertical pipe of the drainage collective pipe joint in the third embodiment.
Figure 17:
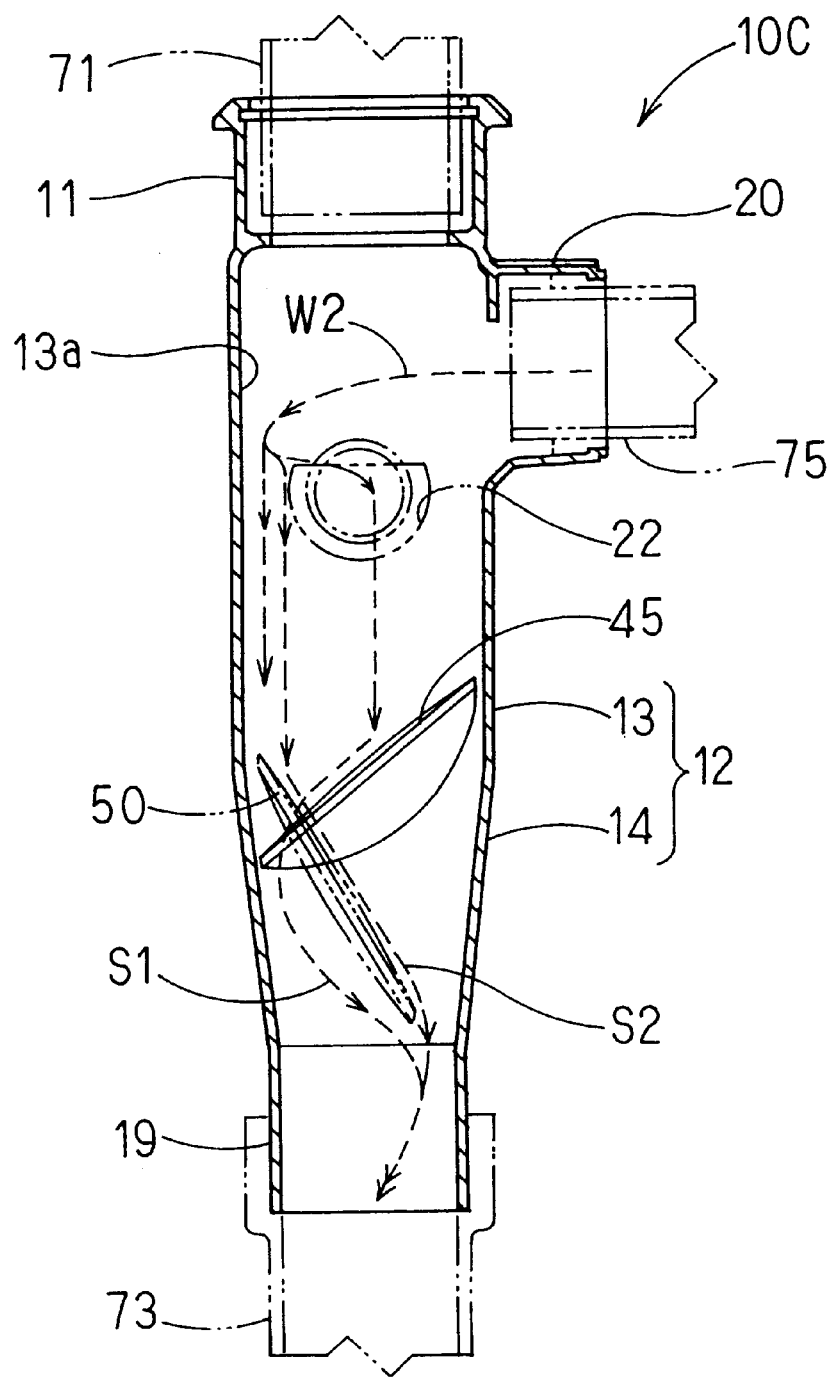
FIG. 17 is a sectional view showing flow of wastewater flowing from a horizontal branch pipe for sewage of the drainage collective pipe joint in the third embodiment.

The second swirl guide 50 is formed so that the projection on the horizontal plane is positioned within the half of circle, and the second swirl guide 50 is inwardly projected from the inner circumferential wall 14a of the taper pipe part 14, and is against the first swirl guide 45 with respect to the pipe axis Y—Y. The second swirl guide 50 controls the drainage flow and is provided to form the second swirl flow. A projection end edge 51 is formed linear, and is slanted in left downward direction (left downward by about 60 degrees in this example) in the length direction as shown in FIG. 13. Also the projection front slant angle to the pipe axis Y—Y direction is formed downward by about two degrees.

The left downward slant angle of the second swirl guide 50 is preferably made downward within the range of 45 to 75 degrees from the horizontal line from the viewpoint of the lead angle of the helix made by the formed second swirl flow S2 and of the prevention of the water plug phenomenon, and the front slant angle is preferably made downward within the range of 0 to 15 degrees from the horizontal line.

The top end of the projection end edge 51 is formed at the position in substantially the same pipe axis Y—Y direction as that of the bending part 15, and the bottom end of the projection end edge 51 is transmitted to the inner circumferential wall 14a at lower side of the taper pipe part 14. The distance N between the projection end edge 51 and the pipe axis Y—Y (refer to FIG. 12) is formed in the range of 0.2 to 0.5 d, and the minimum straight line distance P between the projection end edge 51 and the projection end edge 46 of the first swirl guide 45 (refer to FIG. 12) is made at least 1.0 d. Further the projection end edge 46 and the projection end edge 51 are formed in the parallel relation in the projection on the horizontal plane, and are also formed in the parallel relation to the axial line of the horizontal branch pipe connection port 20. In addition, the projection on the horizontal plane of the projection end edges 46 and 51 is not limited to the parallel relation.

Next, function of the pipe joint 10C constituted in such way will be described.

The upper vertical pipe 71 and the lower vertical pipe 73 are connected respectively to the upper vertical pipe connection port 11 and the lower vertical pipe connection port 19 of the pipe joint 10C, and a toilet bowl (not shown) is connected to the horizontal branch pipe connection port 20 through the horizontal branch pipe 75, and the horizontal branch pipe 77 for the wastewater from a bath room or the like is connected to the horizontal branch pipe connection port 22.

The wastewater flowing within the upper vertical pipe 71 usually flows down in the state that a water film is spread on the inner wall surface of the pipe, and the air vent core is formed at the inner circumference side of the water film. Wastewater W1 flowing from the upper vertical pipe connection port 11 into the main body part 12 (shown by broken line arrow W1 in FIG. 16) falls along the inner circumferential wall 13a, and a part of the wastewater attains to an upper surface of the first swirl guide 45 and another part attains onto the second swirl guide 50.

The wastewater W1 attaining to the first swirl guide 45 is guided to the left downward slant and changed in the flowing course and reduced in the flow rate and supplied with the swirling property and then becomes the first swirl flow S1 in the counterclockwise direction and flows into the lower side of the taper pipe part 14. The wastewater W1 attaining onto the second swirl guide 50 is guided to the left downward slant and is supplied with the swirling property and then becomes the second swirl flow S2 in the counterclockwise direction and flows down to the lower side of the taper pipe port 14. Further the residual wastewater W1 is received with to the taper pipe part 14 and contacted with the lower surface side of the second swirl guide 50 and changed in the flowing direction and flows down while supplied with the swirling property in the counterclockwise direction.

The first swirl flow S1, the second swirl flow S2 and the residual flow are joined together at lower side of the taper pipe part 14, and the joined flow flows down to the lower vertical pipe connection port 19. The joining is performed in that the first swirl flow S1 with small lead angle enters the second swirl flow S2 and the residual flow with large lead angle thereby the second swirl flow S2 and the residual flow are influenced by the flowing force of the first swirl flow S1 and further deflected and reduced in the flow rate and become a combined flow with the decreased lead angle and the reduced flow rate in comparison with the second swirl flow S2 thus the combined flow becomes the integral swirl flow and flows down while holding the air vent core in the pipe axis part.

Even if the wastewater W1 attaining onto the first swirl guide 45 and the second swirl guide 50 has rebound, since the spaced distance L between the top end of the first swirl guide 45 and the lower horizontal branch pipe 77 is 50 mm or more, the wastewater W1 does not flow reversely to the horizontal branch pipe 77 and the horizontal branch pipe 75.

On the other hand, the wastewater W2 of large flow rate from the horizontal branch pipe 75 (shown by broken line arrow W2) flows from the horizontal branch pipe connection port 20 into the main body part 12 and collides in a curve with the inner circumferential wall 13a at the opposite side. Here the wastewater W2 is separated into three stream lines, stream line directed straight downward along the inner circumferential wall 13a and two stream lines separated to lateral directions and then directed downward, and the wastewater W2 in the three stream lines flows down.

One stream line of the two stream lines separated laterally attains to the first swirl guide 45, and forms the first swirl flow S1 in a similar manner to that above described. The other stream line of the two stream lines separated laterally attains to the second swirl guide 50, and forms the second swirl flow S2 in a similar manner to that above described. Also the stream line directed straight downward is received with the taper pipe part 14 and contacted with the lower surface side of the second swirl guide 50 and is changed in the flowing direction and flows down while provided with the swirling property in the counterclockwise direction. The flow along the inner circumferential wall 13a is prevented from flowing into the horizontal branch pipe connection port 22 by the counterflow prevention wall 23.

The first swirl flow S1, the second swirl flow S2 and the flow directed straight downward are joined together at lower side of the taper pipe part 14, and the joined flow flows down to the lower vertical pipe connection port 19. The joining is performed in that the first swirl flow S1 with small lead angle enters the second swirl flow S2 and the flow directed straight downward with large lead angle thereby the second swirl flow S2 and the flow directed straight downward are influenced by the flowing force of the first swirl flow S1 and are further deflected and reduced in the flow rate and become a combined flow with the decreased lead angle and the reduced flow rate in comparison with the second swirl flow S2 thus the combined flow becomes the integral swirl flow and flows down while holding the air vent core in the pipe axis part. The wastewater W2 which rebounded from the first swirl guide 45 and the second swirl guide 50 dose not flow reversely to the horizontal branch pipe 75 and 77 in a similar manner to that in the wastewater W1.

With respect to the wastewater from the horizontal branch pipe 77, the flow rate flowing at a time is a little and the flowing force is small. Consequently the wastewater from the horizontal branch pipe 77 flows within the main body part 12 onto the second swirl guide 50 just below it, and the wastewater from the horizontal branch pipe 77 is caught in the wastewater W1, W2 and flows down toward the lower vertical pipe connection port 19 while swirling.

The wastewater flowing into the pipe joint 10C does not flow reversely to the horizontal branch pipes 75 and 77 but the effective swirling and reduction of the flow rate are performed and the wastewater becomes a swirl flow and flows down. Consequently the air vent core in the pipe axis Y—Y direction is formed within the pipe joint 10C and the air vent is performed between the upper vertical pipe 71 and the lower vertical pipe 73 thereby the fluctuation of the air pressure in the drainage pipe system is suppressed effectively.

Figures 18, 19:
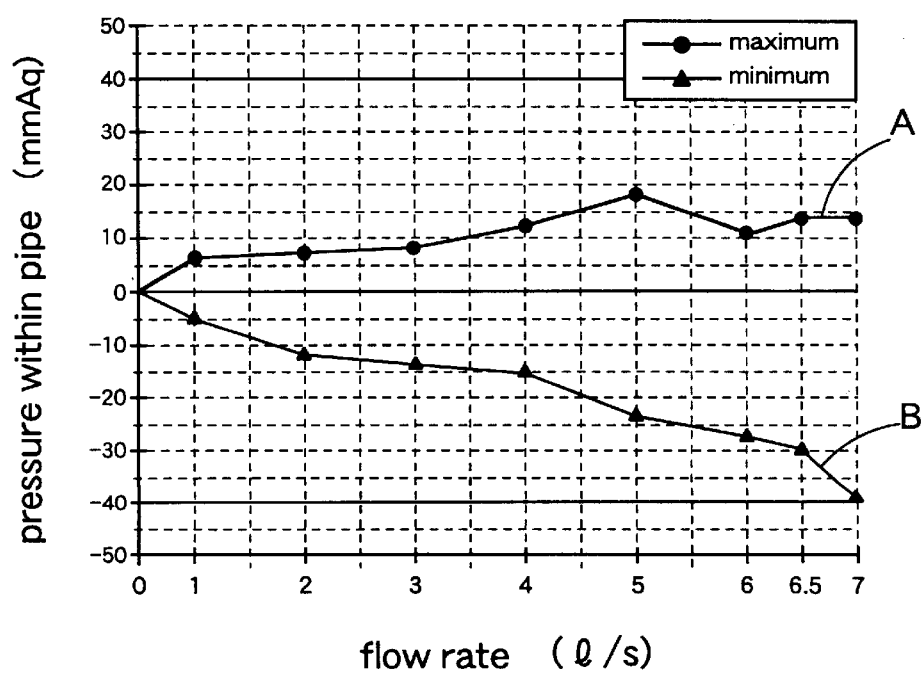
FIG. 18 is a table showing fluctuation of minimum value and maximum value of the air pressure within a pipe in each flow rate in measured values together with each floor having the value when the drainage collective pipe joint in the third embodiment is used.
FIG. 19 is a graph showing in curves the fluctuation values of the air pressure within the pipe of FIG. 18.

FIGS. 18 and 19 show pressure fluctuation within a pipe relating to flow rate in a drainage pipe system corresponding to a collective housing of seven floors using a pipe joint 10C in this embodiment.

In FIG. 18, the minimum value and the maximum value of the pressure within the pipe relating to flow rate and corresponding floors are shown in numerical values. In FIG. 19, the maximum value in each flow rate is shown by curve A, and the minimum value is shown by curve B. As clearly seen from FIGS. 18 and 19, in the pipe joint 10C, both plus and minus pressure are within allowable pressure range (±40 mm Aq) even at such large flow rate as flow rate 7 l/s, and the pipe joint 10C shows excellent suppressing effect of fluctuation of the air pressure.

Figure 20:
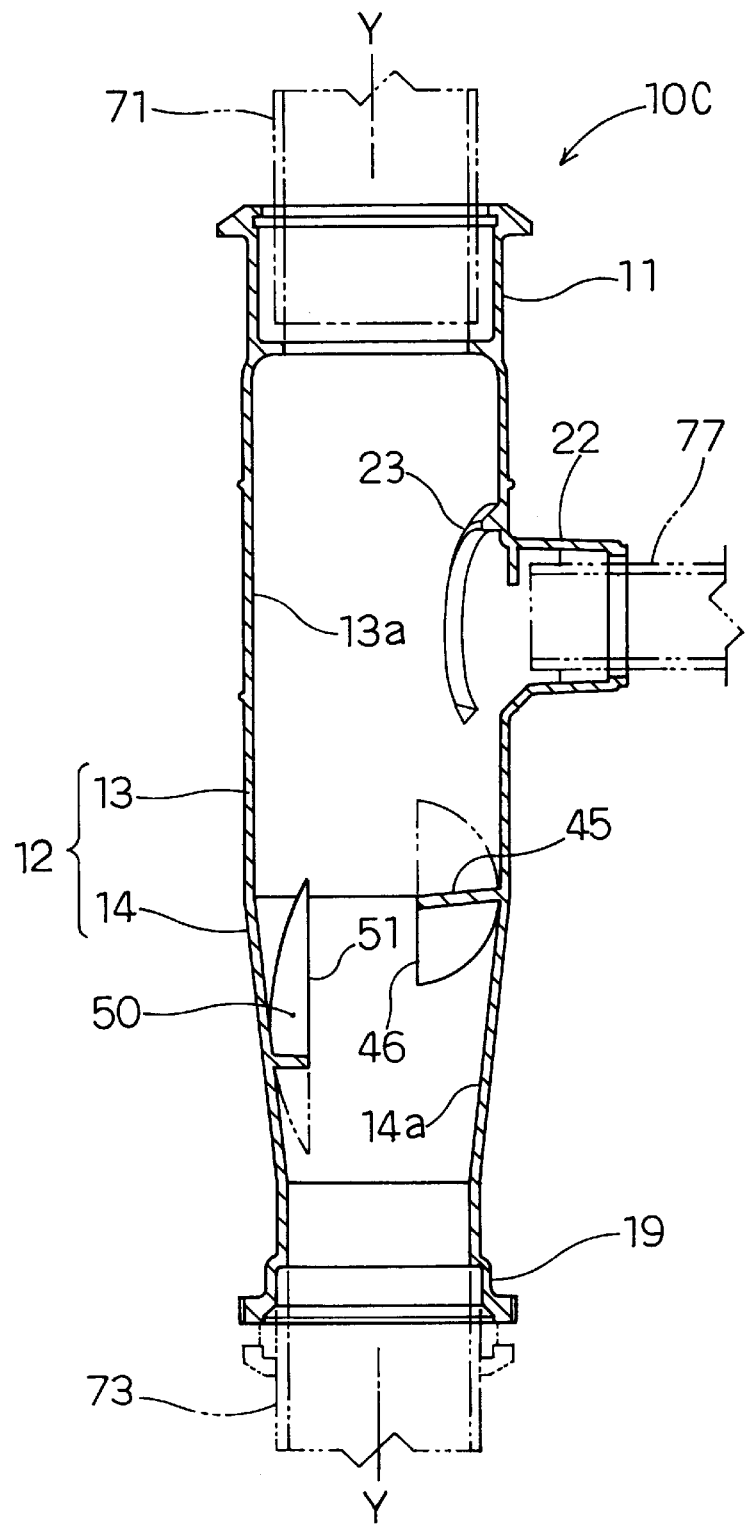
FIG. 20 is a front sectional view showing a modification of a drainage collective pipe joint of the third embodiment.

FIG. 20 shows a modification in the above-mentioned pipe joint 10C.

The first swirl guide 45 and the second swirl guide 50 shown in FIG. 20 are formed where each lateral sectional surface is in flat shape and projected. Distance L between the first swirl guide 45 and the horizontal branch pipe 77, and distances M, N, P determining the relative position of the first swirl guide 45 and the second swirl guide 50 are formed respectively in a similar manner to that of the pipe joint 10C shown in FIGS. 11 to 15. This modification is most favorable for formation of the pipe joint 10C by disappearing model casting.

Figure 21:
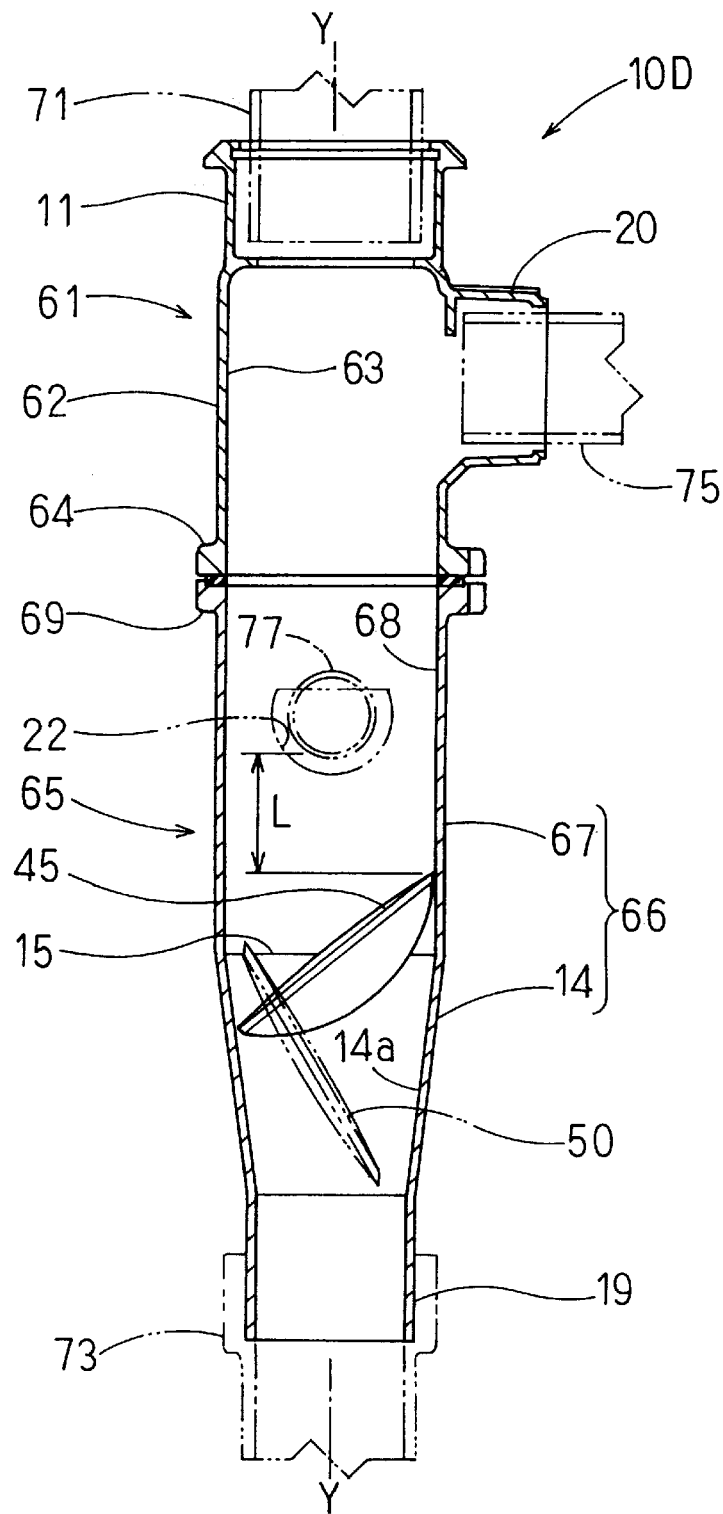
FIG. 21 is a front sectional view of a drainage collective pipe joint in a fourth embodiment.

FIG. 21 shows the fourth embodiment of the present invention. The fourth embodiment is characterized in that a drainage collective pipe joint is constituted by two bodies, an upper body and a lower body.

A pipe joint 10D in the fourth embodiment comprises an upper collective pipe 61 having an upper vertical pipe connection port 11 and a horizontal branch pipe connection port 20, and a lower collective pipe 65 having a lower vertical pipe connection port 19, a horizontal branch pipe connection port 22, a first swirl guide 45 and a second swirl guide 50, and the upper collective pipe 61 and the lower collective pipe 65 are connected almost vertically and are constituted integrally.

The upper collective pipe 61 has an upper body part 62 with diameter substantially the same as that of the main body part 12 of the pipe joint 10C in the third embodiment. The upper vertical pipe connection port 11 is formed on the top end of the upper collective pipe 61, and the horizontal branch pipe connection port 20 is formed on the side wall thereof, and an upper junction part 64 of flange shape is formed on the bottom end thereof.

The lower collective pipe 65 has a lower main body part 66 with constitution substantially similar to that of a lower half part of the main body part 12 of the pipe joint 10C. The lower main body 66 is constituted by a lower cylindrical part 67 with the same diameter as that of the upper main body part 62 and a taper pipe part 14.

A lower junction part 69 of flange shape is projected on the top end of the lower main body part 66, and a horizontal branch pipe connection port 22 is projected on the side wall of the lower cylindrical part 67. The first swirl guide 45 is projected from an inner circumferential wall 68 at lower side thereof to the inner circumferential wall 14a, and the second swirl guide 50 is projected to the inner circumferential wall 14a asymmetrically to the first swirl guide 45. Also the lower vertical pipe connection port 19 is formed at lower part of the lower main body part 66. Constitution of the first swirl guide 45 and the second swirl guide 50 is similar to that in the third embodiment.

The upper collective pipe 61 and the lower collective pipe 65 are connected integrally in that the horizontal branch pipe connection port 20 and the first swirl guide 45 are in the same circumferential position as that of the pipe joint 10C and the upper junction part 64 and the lower junction part 69 are tightened by a bolt through packing. The inner circumferential wall 63 of the upper main body part 62 and the inner circumferential wall 68 of the main body part 66 communicate with each other, and correspond to the inner circumferential wall 13a of the pipe joint 10C.

According to the pipe joint 10D of the fourth embodiment, the reduction of the flow rate of the wastewater and the swirl control can be performed in similar manner to that of the pipe joint 10C of the third embodiment. Since the horizontal branch pipe connection port 20 is provided to the upper collective pipe 61 and the horizontal branch pipe connection port 22 is provided to the lower collective pipe 65, the lower part of the pipe joint 10D is directly connected to a toilet bowl which is embedded to lower step side of so-called stepped slab and set to the upper step side of the stepped slab through the horizontal branch pipe 75, and the horizontal branch pipe 77 from a bath room or the like is directly connected to the horizontal branch pipe connection port 22. Thereby a housing without floor level difference can be formed. In the above description, the dividing position of the upper collective pipe 61 and the lower collective pipe 65 may be changed. For example, both may be divided in upper side and lower side at a position between the horizontal branch pipe connection port 22 and the first swirl guide 45.

In the above-mentioned constitution, a plurality of first swirl guides 45 and a plurality of second swirl guide 50 may be installed. Also the first swirl guide 45 and the second swirl guide 50 may be arranged so that in the projection on the vertical plane, the bottom end of one swirl guide is positioned at lower side than the top end of the other swirl guide and opposed. The first swirl guide 45 may be arranged at lower side and the second swirl guide 50 may be arranged at upper side and the two stream lines of the swirl flow may be joined together at lower side of the first swirl guide 45.

Further the projection end edges 46 and 51 may be of shape other than straight line, for example, may be of arc shape or swelling shape in bent state.

What is claimed is:

1. A drainage collective pipe joint comprising:

an upper vertical pipe connection port capable of connecting an upper vertical pipe;

a main body part having a taper pipe part formed in a downward taper shape at a lower portion of the main body part, wherein an upper portion of the main body part is connected to the upper vertical pipe connection port;

a lower vertical pipe connection port installed at a lower end of the taper pipe part and capable of connecting a lower vertical pipe;

at least one horizontal branch pipe connection port installed at the main body part and capable of connecting a horizontal pipe;

a plurality of drainage flow control guide means projected from an inner circumferential wall of the main body part below the at least one horizontal branch pipe connection port and capable of controlling the drainage flow, wherein the plurality of drainage flow control guide means comprise at least one upper drainage control guide means and at least one lower drainage flow control guide means, wherein said at least one upper drainage control guide means is installed, in the pipe axial direction, above said at least one lower drainage control guide means.

2. A drainage collective pipe joint comprising:

an upper vertical pipe connection port capable of connecting an upper vertical pipe;

a main body part having a taper pipe part formed in a downward taper shape at a lower portion of the main body part, wherein an upper portion of the main body part is connected to the upper vertical pipe connection port;

a lower vertical pipe connection port installed at a lower end of the taper pipe part and capable of connecting a lower vertical pipe;

a plurality of horizontal branch pipe connection ports installed at the main body part and capable of connecting a plurality of horizontal pipes; and at least one swirl guide projected at an inner circumferential wall of the main body part and capable of controlling the drainage flow, wherein the main body part is provided with at least one flow rate reduction guide projected from an inner circumferential wall of the main body part below said plurality of horizontal branch pipe connection ports and above said at least one swirl guide and wherein said flow rate reduction guide is capable of controlling and deflecting the drainage flow to form a swirl flow and reduce a flow rate of the drainage flow.

3. A drainage collective pipe joint as set forth in claim 2, wherein said at least one flow rate reduction guide is projected in a triangular pyramid shape, wherein an upper edge line of the triangular pyramid shape deflects the lower side in the direction of flowing of the swirl flow.

4. A drainage collective pipe joint comprising:

an upper vertical pipe connection port connecting an upper vertical pipe;

a main body part having a straight pipe shell part in straight pipe shape and a taper pipe part formed in downward taper shape at lower side of the straight pipe shell part and installed at lower side of the upper vertical pipe connection port;

a lower vertical pipe connection port installed at lower side of the main body part and connecting a lower vertical pipe; and at least one horizontal branch pipe connection port installed at the main body part and capable of connecting a horizontal branch pipe, wherein the main body part is provided with at least one first swirl guide and at least one second swirl guide projected from an inner circumferential wall at lower side of the horizontal branch pipe connection port respectively and capable of controlling the drainage flow, and the first swirl guide and the second swirl guide are opposed asymmetrically with respect to the pipe axis.

5. A drainage collective pipe joint as set forth in claim 4, wherein the sectional surface of the first swirl guide and the second swirl guide is formed in flat plane shape.

6. A drainage collective pipe joint as set forth in claim 4, wherein the center part of the projection end edge of the first swirl guide in the length direction is formed at the position in substantially the same vertical direction as that of the top end of the taper pipe part, and the top end part of the projection end edge of the second swirl guide in the length direction is formed at the position in substantially the same vertical direction as that of the top end of the taper pipe part and is opposed to the first swirl guide.

7. A drainage collective pipe joint as set forth in claim 5, wherein the center part of the projection end edge of the first swirl guide in the length direction is formed at the position in substantially the same vertical direction as that of the top end of the taper pipe part, and the top end part of the projection end edge of the second swirl guide in the length direction is formed at the position in substantially the same vertical direction as that of the top end of the taper part and is opposed to the first swirl guide.

8. A drainage collective pipe joint as set forth in claim 4, wherein the projection end edge of the first swirl guide is slanted in the length direction downward within the range of 30 to 50 degrees, and the center part of the projection end edge in the length direction is formed at the position in substantially the same vertical direction as that of the top end of the taper part, and the projection end edge of the second swirl guide is slanted in the length direction downward within the range of 45 to 75 degrees, and the top end of the projection end edge in the length direction is formed at the position in substantially the same vertical direction as that of the top end of the taper pipe part and is opposed to the first swirl guide.

9. A drainage collective pipe joint as set forth in claim 5, wherein the projection end edge of the first swirl guide is slanted in the length direction downward within the range of 30 to 50 degrees, and the center part of the projection end edge in the length direction is formed at the position in substantially the same vertical direction as that of the top end of the taper pipe part, and the projection end edge of the second swirl guide is slanted in the length direction downward within the range of 45 to 75 degrees, and the top end of the projection end edge in the length direction is formed at the position in substantially the same direction as that of the top end of the taper pipe part and is opposed to the first swirl guide.

10. A drainage collective pipe joint as set forth in claim 4, wherein the projection end edge of the first swirl guide is slanted in the length direction downward within the range of 30 to 50 degrees, and the top end of the projection end edge in the length direction is formed at the position in substantially the same vertical direction as that of the taper pipe part, and the projection end edge of the second swirl guide is slanted in the length direction downward within the range of 45 to 75 degrees, and the center part of the projection end edge in the length direction is formed at the position in substantially the same vertical direction as that of the top end of the taper pipe part and is opposed to the first swirl guide.

11. A drainage collective pipe joint as set forth in claim 5, wherein the projection end edge of the first swirl guide is slanted in the length direction downward within the range of 30 to 50 degrees, and the top end of the projection end edge in the length direction is formed at the position in substantially the same vertical direction as that of the top end of the taper pipe part, and the projection end edge of the second swirl guide is slanted in the length direction downward within the range of 45 to 75 degrees, and the center part of the projection end edge in the length direction is formed at the position in substantially the same vertical direction as that of the top end of the taper pipe part and is opposed to the first swirl guide.

12. A drainage collective pipe joint as set forth in claim 4, wherein distance in the vertical direction between the top end in the length direction of the projection end edge of the first swirl guide and the pipe bottom of the horizontal branch pipe connected to the horizontal branch pipe connection port in the lowest position is made at least 50 mm.

13. A drainage collective pipe joint as set forth in claim 5, wherein distance in the vertical direction between the top end in the length direction of the projection end edge of the first swirl guide and the pipe bottom of the horizontal branch pipe connected to the horizontal branch pipe connection port in the lowest position is made at least 50 mm.

14. A drainage collective pipe joint as set forth in claim 4, wherein the main body part is divided into an upper collective pipe having the upper vertical pipe connection port and a lower collective pipe having the lower vertical pipe connection port, and both collective pipes are connected integrally.

15. A drainage collective pipe joint as set forth in claim 5, wherein the main body part is divided into an upper collective pipe having the upper vertical pipe connection port and a lower collective pipe having the lower vertical pipe connection port, and both collective pipes are connected integrally.

16. A drainage collective pipe joint comprising:

an upper vertical pipe connection port capable of connecting an upper vertical pipe;

a main body part having a taper pipe part formed in a downward taper shape at a lower portion of the main body part, wherein an upper portion of the main body part is connected to the upper vertical pipe connection port;

a lower vertical pipe connection port installed at a lower end of the taper pipe part and capable of connecting a lower vertical pipe;

at least one horizontal branch pipe connection port installed at the main body part and capable of connecting a horizontal pipe;

a plurality of drainage flow control guide means projected from an inner circumferential wall of the main body part below the at least one horizontal branch pipe connection port and capable of controlling the drainage flow, wherein the plurality of drainage flow control guide means comprise at least one upper drainage control guide means and at least one lower drainage flow control guide means, wherein said at least one upper drainage control guide means is installed, in the pipe axial direction, above said at least one lower drainage control guide means; wherein there is no drainage flow control guide means above the at least one horizontal branch pipe connection port.

17. A drainage collective pipe joint comprising:

an upper vertical pipe connection port capable of connecting an upper vertical pipe;

a main body part having a taper pipe part formed in a downward taper shape at a lower portion of the main body part, wherein an upper portion of the main body part is connected to the upper vertical pipe connection port;

a lower vertical pipe connection port installed at a lower end of the taper pipe part and capable of connecting a lower vertical pipe;

a plurality of horizontal branch pipe connection ports connected to the main body part having all portions of said horizontal branch pipe connection ports at a substantially right angle to a vertical axis of the main body part, wherein said at least one horizontal branch pipe connection port is capable of connecting a horizontal pipe; and at least one swirl guide projected at an inner circumferential wall of the main body part and capable of controlling the drainage flow, wherein the main body part is provided with at least one flow rate reduction guide projected from an inner circumferential wall of the main body part below said plurality of horizontal branch pipe connection ports and above said at least one swirl guide and wherein said flow rate reduction guide is capable of controlling and deflecting the drainage flow to form a swirl flow and reduce a flow rate of the drainage flow.

* * * * *